June 9, 1942.  R. C. HOPKINS  2,285,973
PRESSURE LIQUID BLENDING APPARATUS AND PROCESS
Filed Jan. 22, 1941
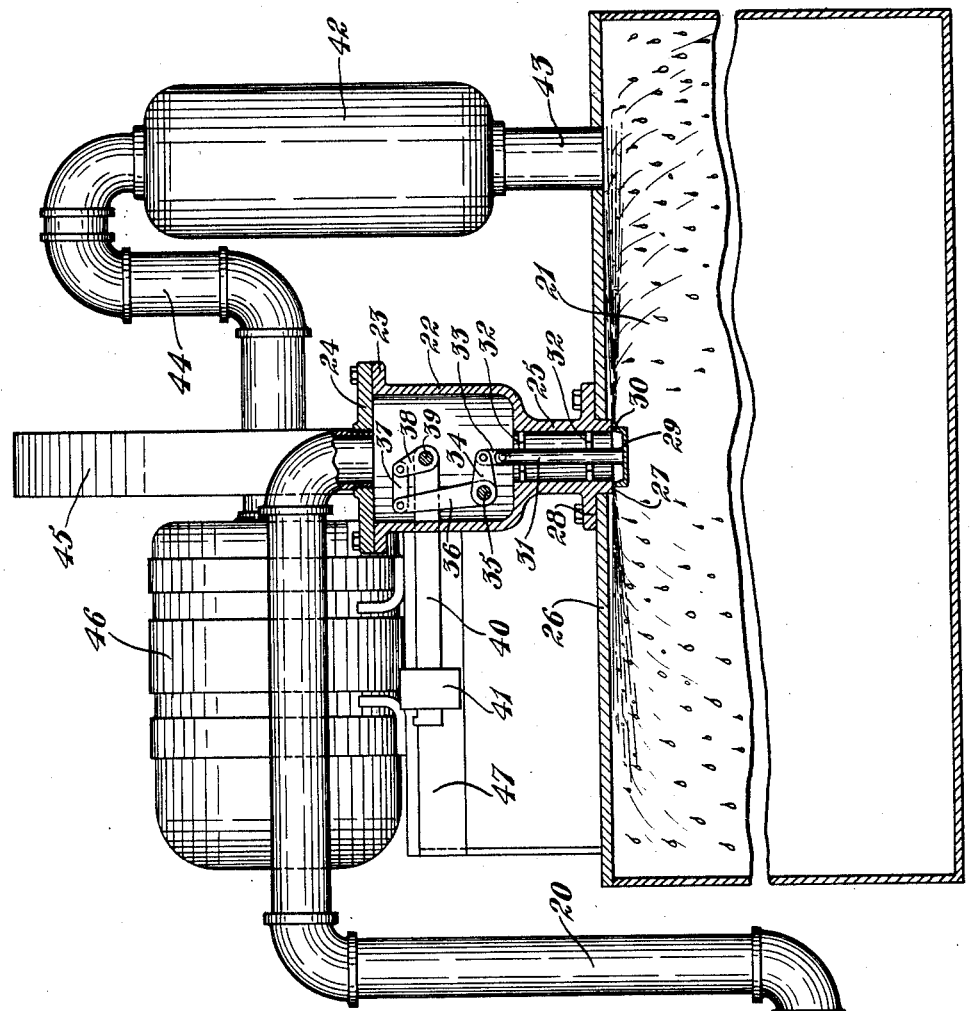
Inventor
Robert C. Hopkins
By Frease & Bishop
Attorneys Patented June 9, 1942

2,285,973

UNITED STATES PATENT OFFICE 2,285,973

PRESSURE LIQUID BLENDING APPARATUS AND PROCESS

Robert C. Hopkins, Alliance, Ohio

Application January 22, 1941, Serial No. 375,375

12 Claims. (Cl. 183—2.5)

The invention relates to the blending of liquids, and more particularly to the mixing and blending of liquids at pressures above atmospheric.

The object of the invention is to provide for the blending of an oil, or other liquid, or liquid combination of materials, which consists in subjecting the liquid to a violent agitation and milling action at a pressure above atmospheric, to thoroughly mix and blend the liquid, and then suddenly releasing the pressure to atmospheric.

Another object is to provide for the separation of gases and air from the blended liquid and the immediate removal of the gases and air, leaving the blend free therefrom.

A further object of the invention is the provision of apparatus for carrying out the improved pressure blending process, such apparatus comprising a rotary attrition mill in which the liquid is mixed and blended while maintained under pressure above atmospheric, the discharge side of the mill being connected to a separation tank through a pressure release valve, means being provided for exhausting air and gases from the separation tank so that the same may be maintained at or below atmospheric pressure.

A still further object is the provision of means for causing the blended liquid to wash along the under side of the head of the separation tank, as it is discharged from the pressure release valve, the friction thus set up producing a shower of oil in the tank which facilitates the separation of oil and gases from the liquid.

The above objects, together with others which will be apparent from the drawing and following description, or which may be later referred to, may be attained by carrying out the invention in the manner hereinafter described in detail, and illustrated in the accompanying drawing, in which the figure is a sectional elevation of apparatus by which the improved process is carried out In the apparatus illustrated in the drawing, liquid under pressure greater than atmospheric is pumped from any suitable source through the inlet pipe 10 to the rotary cutting, mixing, and attrition mill indicated generally at 11, and which may be of the general type shown in any of my prior patents as follows: Nos. 1,764,022 dated June 17, 1930; 1,775,721 dated Sept. 16, 1930; 1,796,104 dated Mar. 10, 1931; 1,873,409 dated Aug. 23, 1932; 2,111,364 dated Mar. 15, 1938.

This mill comprises generally a housing 12 within which is journaled a shaft 13 carrying a gang of rotary cutters 14 having saw teeth 15 arranged to cooperate with the radially disposed partition walls 16 which divide the housing, around the rotary cutting unit, into a plurality of attrition chambers 17.

The liquid to be blended enters the inlet chamber 18 and after passing around the rotary cutting unit and through the several attrition chambers 17 is carried to the outlet chamber 19 and then still under pressure through the pipe 20 to the receiving or separating tank 21.

The pressure release valve is located between the pipe 20 and the tank 21 and comprises the housing 22, having a flanged upper end 23 to which is connected the top plate 24 into which the end of the pipe 20 is screw threaded or otherwise connected.

The lower portion of the housing terminates in a reduced neck 25 which enters the top wall 26 of the tank and forms a valve seat 27, a flange 28 being preferably formed around said neck for connection to the top wall of the tank.

The valve comprises a head 29 around the periphery of which is provided the cylindric flange 30 preferably tapered toward its upper edge for seating against the flat valve seat 27.

The stem 31 of this valve is slidably mounted through suitable guide spiders 32 located within the neck 25, the lower end of the stem being rigidly connected to or formed integral with the head 29 of the valve.

A link 33 is pivotally connected at one end to the upper end of the valve stem and at its other end to one arm 34 of a bell crank fulcrumed as at 35 within the housing 22, the other arm 36 thereof being pivotally connected to one end of a link 37 the other end of which is pivotally connected to a rocker arm 38 fixed upon the rocker shaft 39 journaled within the housing.

A lever 40 is fixed upon the rocker shaft 39 at a point outside of the housing and has mounted thereon an adjustable weight 41 for normally controlling the levers and linkage above described so as to hold the pressure release valve in closed position with the tapered peripheral flange 36 thereof tightly seated upon the valve seat 27.

A vapor separator indicated generally at 42 is connected at one end to the tank 21 as by the pipe 43 the other end of the vapor separator being connected by the pipe 44 with a centrifugal exhaust fan indicated generally at 45, said fan being operated by the motor 46 which may be supported upon a bracket 47 mounted upon the tank 21.

In carrying out the improved process upon the apparatus above described an oil or other liquid or a liquid mixture of several materials may be pumped through the inlet pipe 10 into the mill 11 under greater than atmospheric pressure.

For the most intensive mixing and blending of the liquid the pressure may be as high as 300 pounds per square inch or even higher.

This pressure is maintained within the mill as the liquid is carried around the rotary cutting unit 14 and whirled around within one attrition chamber after the other and finally discharged from the mill into the pipe 20 wherein the same pressure is maintained.

In this milling process there are certain condensates and light hydro-carbon particles, in the case of oil, which are converted into gas.

These gases and also air, appear as minute bubbles, and being under pressure their form is retained for a considerable length of time, depending on other characteristics of the liquids, which may be either free flowing or of high viscosity.

As the milled liquid under pressure passes from the pipe 20 into the housing 22 the pressure of the liquid against the valve 29 overcomes the weight of the weighted lever arm 40 opening the valve and causing the liquid to spray outward in a horizontal disk washing against the surface of the top wall 26 of the receiving chamber 21, which is maintained at or below atmospheric pressure.

As the discharged liquid washes along the underside of the flat wall 26 friction is set up and the liquid will shower down into the tank facilitating separation of gases and air from the liquid.

The gas and air is withdrawn through the vapor separator 42 to the suction fan 45 where it is discharged, any liquid which may be drawn into the separator 42 being free to drop back into the tank.

As will be seen from the above there are two important features to the improved process, first, the blending of the liquid under pressure higher than atmospheric and second, the sudden release of that pressure causes the gas and air bubbles to burst, releasing the contents of cell-like formations and thus accomplishing the separation of the gases from the liquid.

I claim:

1. The herein described process of blending liquid comprising violently agitating the liquid and subjecting it to milling action while under pressure greater than atmospheric to release gases and air from the liquid in the form of bubbles, and then suddenly lowering the pressure substantially to atmospheric causing the bubbles to burst from internal pressure and producing instantaneous separation of liquid and gases.

2. The herein described process of blending liquid comprising confining the liquid in a chamber under greater than atmospheric pressure and violently agitating the liquid and subjecting it to milling action while under such pressure to release gases and air from the liquid in the form of bubbles, and then discharging the liquid in a thin sheet into a chamber under substantially atmospheric pressure causing the bubbles to burst from internal pressure and producing instantaneous separation of liquid and gases.

3. The herein described process of blending liquid comprising violently agitating the liquid and subjecting it to milling action under pressure greater than atmospheric to release gases and air from the liquid in the form of bubbles, and then suddenly lowering the pressure substantially to atmospheric and washing the released liquid in a thin sheet across a flat surface and showering it downward causing the bubbles to burst from internal pressure and producing instantaneous separation of liquid and gases.

4. The herein described process of blending liquid comprising confining the liquid in a chamber under greater than atmospheric pressure and violently agitating the liquid and subjecting it to milling action while under such pressure to release gases and air from the liquid in the form of bubbles, and then discharging the liquid into a chamber under substantially atmospheric pressure and washing the released liquid in a thin sheet across a flat surface and showering it downward causing the bubbles to burst from internal pressure and producing instantaneous separation of liquid and gases.

5. The herein described process of blending liquid comprising violently agitating the liquid and subjecting it to milling action under pressure greater than atmospheric to release gases and air from the liquid in the form of bubbles, and then suddenly lowering the pressure substantially to atmospheric causing the bubbles to burst from internal pressure and producing instantaneous separation of liquid and gases, and then withdrawing the released gases.

6. The herein described process of blending liquid comprising confining the liquid in a chamber under greater than atmospheric pressure and violently agitating the liquid and subjecting it to milling action while under such pressure to release gases and air from the liquid in the form of bubbles, then discharging the liquid into a chamber under substantially atmospheric pressure causing the bubbles to burst from internal pressure and producing instantaneous separation of liquid and gases, and then withdrawing the released gases.

7. Apparatus for blending liquid including a rotary attrition mill, means for admitting liquid under pressure to the mill, a receiving tank communicating with the mill, a pressure release valve between the mill and the tank, and means for lowering the pressure in the tank.

8. Apparatus for blending liquid including a rotary attrition mill, means for admitting liquid under pressure to the mill, a receiving tank communicating with the mill, a pressure release valve between the mill and the tank, the tank having a flat top wall, a head associated with said valve for causing the released liquid to wash against said top wall in a thin sheet and shower into the tank, and means for lowering the pressure in the tank.

9. Apparatus for blending liquid including a rotary attrition mill, means for admitting liquid under pressure to the mill, a receiving tank communicating with the mill, a pressure release valve between the mill and the tank, means operated by pressure of the liquid for opening said valve, and means for lowering the pressure in the tank.

10. Apparatus for blending liquid including a rotary attrition mill, means for admitting liquid under pressure to the mill, a receiving tank communicating with the mill, a pressure release valve between the mill and the tank, a vapor separator communicating with the top of the tank, and suction means communicating with the vapor separator.

11. The herein described process of blending liquid comprising subjecting the liquid to violent agitation and milling action while under pressure up to about three hundred pounds per square inch to release gas and air from the liquid in the form of bubbles, and then discharging the agitated and milled liquid into a chamber maintained at no higher than atmospheric pressure, the liquid being discharged in a thin horizontal sheet across a flat horizontal surface in the chamber and showering the liquid downward through the chamber causing the bubbles to burst from internal pressure and producing instantaneous separation of liquid and gases.

12. Apparatus for blending liquid including a rotary attrition mill, rotary means in said mill for producing violent agitation, cutting and mixing of the liquid, means for admitting liquid under pressure to said mill, a valve casing communicating with the discharge side of the mill, a receiving tank having a flat horizontal top wall provided with an inlet opening with which the valve casing communicates, a pressure release valve in the casing having a vertically movable stem located through said inlet opening and a head upon said stem located within the tank, means for urging the head toward the inlet opening so as to cause liquid released through the valve to wash against said flat top wall in a thin sheet and to shower into the tank, and means for lowering the pressure in the tank.

ROBERT C. HOPKINS.